(12) United States Patent
Reed et al.

(10) Patent No.: US 6,249,600 B1
(45) Date of Patent: Jun. 19, 2001

(54) SYSTEM AND METHOD FOR GENERATION OF A THREE-DIMENSIONAL SOLID MODEL

(75) Inventors: Michael K. Reed, Chappaqua; Peter K. Allen, Pleasantville, both of NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 08/979,221

(22) Filed: Nov. 26, 1997

Related U.S. Application Data (60) Provisional application No. 60/064,906, filed on Nov. 7, 1997.

(51) Int. Cl.$^7$ ............................................. G06K 9/00
(52) U.S. Cl. ......................... 382/154; 382/285; 382/318; 345/420
(58) Field of Search ................................... 382/154, 254, 382/266, 285, 284, 255, 256, 206, 318; 356/2, 3, 3.1; 345/419, 420, 421, 424, 425, 446; 348/47, 48, 50

(56) References Cited

U.S. PATENT DOCUMENTS

| | | | |
|---|---|---|---|
| 4,912,664 | * 3/1990 | Weiss et al. | 364/577 |
| 4,982,438 | * 1/1991 | Usami et al. | 382/25 |
| 5,027,292 | * 6/1991 | Rossignac et al. | 364/522 |
| 5,249,035 | * 9/1993 | Yamanaka | 356/376 |
| 5,375,156 | 12/1994 | Kuo-Petravic et al. | 378/9 |
| 5,621,648 | 4/1997 | Crump | 700/112 |
| 5,675,377 | * 10/1997 | Gibas | 348/47 |
| 5,761,332 | * 6/1998 | Wischmann et al. | 382/131 |
| 5,831,621 | * 11/1998 | Pito | 345/419 |
| 5,887,083 | * 3/1999 | Sumi et al. | 382/199 |
| 5,914,721 | * 6/1999 | Lim | 345/421 |

OTHER PUBLICATIONS

Curless et. al., "A Volumetric Method for Building Complex Models from Range Images," *Proceedings of 23$^{rd}$ International Conference on Computer Graphics and Interactive Techniques*, New Orleans, LA, Aug. 4, 1996, pp. 303–312.

Laurentini, "Inferring the Shape of the Real Object from the Object Reconstructed by Volume Intersection", *Proc. of IEEE Computer Society Conference on Computer Vision and Pattern Recognition*, 1993, pp. 280–285.

Martin et. al., "Volumetric Descriptions of Objects from Multiple Views," IEEE Transactions on Pattern Analysis and Machine Intelligence, vol. 5, 1983, pp. 150–158.

Strenstrom et al., "Constructing Object Models from Multiple Images", Int. Journal of Computer Vision, 9:3, 1992, pp. 185–212.

Turk et. al., "Zippered Polygon Meshes from Range Images", *Proceedings of 21$^{st}$ International SIGGRAPH Conference*, Orlando, FL, 1994, pp. 451–458.

Wang et. al., "Construction of Surface Representation from 3–D Volumetric Scene Description" *Proceedings CVPR '85*, San Francisco, CA, 1985, pp. 130–135.

* cited by examiner

*Primary Examiner*—Jose L. Couso
*Assistant Examiner*—Kanji Patel
(74) *Attorney, Agent, or Firm*—Baker Botts LLP (57) ABSTRACT

A system and method for generating a three-dimensional representation of an object or scene which minimizes the number of range scans required from different positions to produce an image of acceptable resolution. The technique first produces an initial mesh representation from a predetermined number of scans which is transformed into a solid. Vertices and surfaces in the solid mesh are tagged with either an occluded (unscanned) or imaged (scanned) tag. The occlusion tags allows the technique to select the best view for next scanning iteration by identifying the scanable surface area with the most occlusions. The technique then adjusts the object-scanner positioning so that the targeted view is scanned next. The process is repeated until an acceptable resolution of the object is achieved. The use of occlusion tags with a planning stage decreases the minimum number of scans necessary to complete the process.

38 Claims, 11 Drawing Sheets

SYSTEM AND METHOD FOR GENERATION OF A THREE-DIMENSIONAL SOLID MODEL

The application claims priority to the provisional application No. 60/064,906 filed Nov. 7, 1997 by Reed and Allen and entitled SYSTEM AND METHOD FOR GENERATION OF A THREE-DIMENSIONAL SOLID MODEL, which is hereby incorporated by reference.

The U.S. Government has certain rights in this invention pursuant to awards DAAH04-93-G-0245, DAAH04-95-1-0492, CDA-96-25374 and IRI-93-1877.

FIELD OF INVENTION

The present invention relates to the efficient generation of three-dimensional representations of an object or scene which can be used for many purposes.

BACKGROUND OF THE INVENTION

Automatic three-dimensional construction of a computer representation of an object or a scene performed in an efficient manner is becoming increasingly important for many different types of applications utilizing computer modeled objects. An object which is scanned and three-dimensionally modeled by a computer can be used for such purposes as rapid prototyping, advanced structural analysis, manufacturing design and process planning for the object or scene being imaged. For example, using three-dimensional modeling a doctor could scan a hip replacement prototype located in his office, store the image of the prototype as a three-dimensional representation in a computer and transmit over communication lines or by satellite the representation to other doctors across the country and anywhere in the world in real time. The doctors receiving the transmission can then view and analyze the representation on a computer and can even produce a solid object with the same physical characteristics based on the received representation using known techniques. The three-dimensional image can also be used for complicated computer analysis of the structure and can be stored for further analysis at a later time. The stored three-dimensional image can be also sent to doctors, hospitals or research facilities at a later time for further opinions.

Conventional techniques which construct three-dimensional images require a great number of scans from many angles around the object in order to achieve a representation of sufficient resolution which is useful for a particular application. Conventional techniques move the relative position of scanner so that every surface of the object is scanned with overlapping views. Conventional techniques require as much as seventy scans to sufficiently scan an object. In most cases, if an occlusion occurs (e.g., a surface such as the inside of a cavity hidden from the sensor), the conventional imaging technique will ignore the portions of the occlusion and treat them as already scanned even if the occlusion may be able to be better imaged from a different angle. This results in a model that is not substantially accurate for the actual object scanned. When the scans required for the imaging process are large in number, the processing time for the model is extended such that real time imaging cannot be accomplished. Therefore, an efficient technique for creating the three-dimensional representation which limits the number of required scans would be very desirable.

If an efficient three-dimensional modeling technique can be accomplished, many new applications can be realized. For example, a three-dimensional facsimile can be sent electronically of a modeled object where the object at the sending end is scanned and three-dimensionally modeled. The imaged object could then be reproduced at the destination using rapid prototyping at a site anywhere in the world or could even be transmitted through space to a space shuttle or space station. A high quality three-dimensional representation which is efficiently created can also be used to manufacture multiple items simultaneously using copies of the same three-dimensional representation in order to increase manufacturing speed.

SUMMARY OF THE INVENTION

The invention is directed to a system and method for generating a three-dimensional representation of an object or scene which minimizes the number of required scans needed to create a high-quality representation at a desired resolution. The method includes the steps of scanning an object from a number of initial positions to create an initial representation which includes occlusion tags which show if an associated surface has been properly imaged or if the associated surface requires further imaging from a different perspective. The representation is in the form of a solid model which ensures that the entire object is captured in the representation. The object to be imaged may contain occlusions or jagged edges which would not be represented in conventional imaging.

After an initial representation is created, a planning stage determines which next view will include the most surfaces tagged "occluded" by using a volume visibility technique. A target area is then acquired and the scanning equipment position is adjusted to set up for a subsequent scan. The results of the recent scan are combined with the current representation to form a more accurate composite representation. The surfaces which were tagged as "occluded" and which had required further scanning now have their tags changed to "imaged." Thus the scanned surfaces do not require further scanning.

The modeling process can also include the step of shifting the vertices in the mesh model to expand the mesh for the particular scan iteration. This ensures that the entire object is included in the model and outside edges are not cut off due to the resolution of the scanner. The technique eliminates portions of the representation which do not correspond to the actual image by intersecting each model created for each scanning iteration.

BRIEF DESCRIPTION OF THE DRAWINGS

Further objects, features and advantages of the invention will become apparent from the following detailed description taken in conjunction with the accompanying drawings showing a preferred embodiment of the invention, in which.

DETAILED DESCRIPTION OF PREFERRED EMBODIMENTS

The invention is directed to a system and method for automatically constructing a Computer Aided Design (CAD) model of an unknown object or scene by efficiently utilizing range images obtained from scanning an object from varied perspectives. The method interleaves a sensing operation which scans the image from a particular position and merges the scanned image with previously stored data into the composite model obtained from different perspectives. A single scan from one position can only image the portion of the object in the scanner's line of sight. Another phase of the method determines the best next sensor position in order to capture image information about surfaces on the object which have not yet been imaged due to the selection of sensor positions, curved surfaces and self-occlusions. In order to generate the three-dimensional model, mesh surfaces and solid representations are used to build a model of the range data from each view, which are then merged with the composite model built from previous sensing operations encompassing different perspectives.

The system and method described herein builds a three dimensional model of an unknown object incrementally from multiple range images. The technique constructs a solid model from a mesh surface, and allows identification of the occluded and imaged surfaces, by using techniques applicable to both mesh surfaces and solid representations. By combining these two areas, the technique retains the benefit of mesh surfaces, such as representational flexibility and conceptual simplicity, while still allowing the use of well-defined set-theoretic merging operations inherent in solid models. Benefits of the technique include water-tight models and the ability to acquire both very thin objects and features such as through-holes. The planning portion of the technique relies on the specification of targets on the incomplete model of the object to drive the planning process. This allows a static sensor planner to be used to determine occlusion-free viewpoints of the target and thereby allow each sensing operation to improve the accuracy of the representation. The planning portion avoids using only predetermined sensor positions and is able to take self-occlusions into account, so that the imaging will be more accurate.

Figure 1:
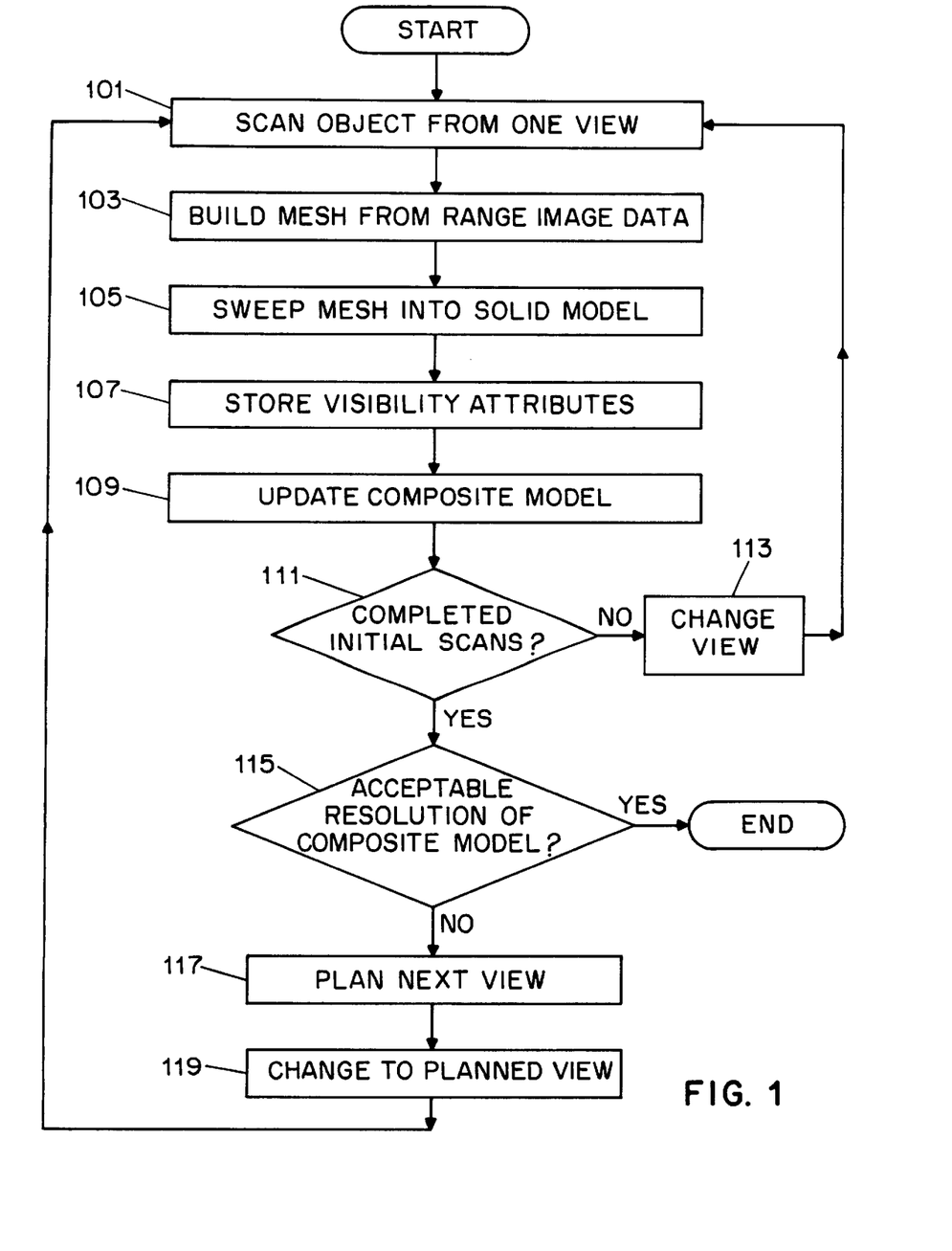
FIG. 1 is a flow chart of the steps for creating a three-dimensional representation in accordance with the invention.

FIG. 1 shows a flow chart of the steps for creating a three-dimensional model of an object. Throughout this specification, the description will refer to scanning and imaging of a specific object. However, a scene containing multiple objects could also be scanned and modeled using the same techniques. The initial phase of the technique scans the object from a predetermined number of locations in order to gain a sufficiently accurate model of the sides of the object to be finished. An example of the predetermined number of locations for the initial scanning process is four, however the actual number selected for the initial phase is dependent on the type of object, type of scanner and desired resolution of the resultant image.

Step 101 in FIG. 1 scans the object from one particular view and generates range data for that perspective. The acquisition of range data can be performed by a robotic system which can be used to generate conventional range-scanning configurations. An example of equipment which can be use is a Servo-Robot laser rangefinder which is attached to an IBM® SCARA robot, where the object to be imaged is placed upon a motorized rotation stage. The rangefinder acquires one scan line of data at a time in a plane perpendicular to the robot's z axis. After each scan line has been acquired, the robot steps the rangefinder a small distance along the axis in order to scan the entire object in its field of view. The result of the scanning process from a particular perspective is a rectangular range image of the object from a particular viewpoint made up of discrete scanned parts, the direction of the viewpoint being controlled by rotating the turntable. Other alternative equipment configurations which can acquire the entire image at one time such as a CCD camera or a scanner with multiple degrees of freedom can also be used for the scanning process. The selected scanner must produce the range data from different perspectives.

Step 103 builds a mesh from the range image data. The points in the range image may be used as vertices in the mesh. Conventional meshes are surface models and do not permit spatial addressability (the ability to classify points as inside, on, or outside the model as required in solid models). When a conventional mesh is used to model a solid, the mesh cannot be closed until the entire solid is modeled from multiple overlapping views. Most conventional mesh models also do not allow for a planning method to select the next best views during the acquisition stage but instead simply model from a predetermined set of perspectives. The predetermined set does not take into account selecting the next best perspective because the mesh is not complete until after all the scanning operations are finished. The mesh created from the range data in the present invention is transferred to a solid model in order to create a starting solid model from the first scan and to increase the efficiency of the imaging process.

Step 105 sweeps the mesh model into a solid model. The extruding (sweeping) operation is a standard operation that can be performed on a CAD system. The extruding technique is stated concisely as:

$$S = \bigcup \text{ extrude } (m), m \in M \; \forall m \quad (1)$$

Figure 2:
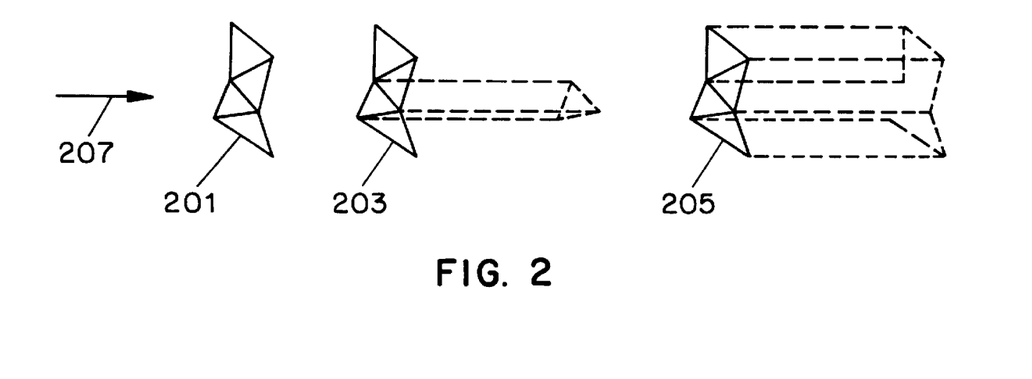
FIG. 2 shows a graphic example of a mesh-sweep operation.

An extrusion operation is applied to each triangular representation m (formed from three adjacent mesh vertices in the mesh M) orthographically along the vector of the rangefinder's sensing axis, until the extruded node comes in contact with the far bounding plane of the region being scanned. The result of this extrusion process performed on three vertices is a five-sided solid of a triangular prism. FIG. 2 shows a graphic example of the mesh sweep operation. The adjacent vertices of the range data form a number of triangles as shown in the two dimensional representation 201. Each individual triangular mesh element m is then extruded to form a five sided solid of a triangular prism as shown in representation 203. Representation 205 shows the model when each triangular mesh element is extruded, and the extruded mesh elements are then unioned together by a union operation to form a solid from the single swept mesh. The union operation is performed on the CAD system which stores the range data and performs the sweep operation. The solid model after the extrusion process includes the original mesh-like surface from the acquired range data, a number of lateral faces (or surfaces) equal to the number of vertices on the boundary of the mesh and the bounding surface that caps one end. The result of the union operations includes all the combined swept areas. The direction of the extrusion process is in the sensing direction 207 shown in FIG. 2.

Referring back to FIG. 1, step 105 attaches a visibility attribute to each surface generated in the solid model. The visibility attribute is stored in memory in conjunction with the solid representation. Each surface of the solid representation is assigned a corresponding visibility attribute. In the present invention, it is important to store occlusion information concerning the range data in order to properly plan the optimal location of the scanner for the next scanning operation. It is advantageous to select a position which maximizes the scanning of the surfaces which have not yet been viewed on the object. The solid model therefore incorporates information about the model's sensed surfaces with tags that label each surface element as "occluded" or "imaged." "Occluded" portions of the object are surfaces which have not been imaged. Surfaces of the object which are defined by connecting adjacent vertices with edges can be occluded from the scanning process because of factors such as the position of the sensor or the curvature of the object. There are two related techniques which are used to determine if a model surface represents an occluded region of the object. First, if the length of an edge of the model surface calculated between two adjacent vertices exceeds a predetermined threshold, then the corresponding surface is considered occluded. A relatively long edge indicates that a large area exists between the two vertices and that the area surrounding the edge should be further scanned in order to properly model the area. A second method used in determining if a surface in the solid model is occluded is performed by calculating the normal of the surface relative to the line of sight from the midpoint of the surface to the center of the sensor. If the surface normal relative to the line of sight is close to 90 degrees, then the surface is considered occluded. The cutoff for this angle indicating an occluded edge and surface is preferably 75 degrees, although this cutoff will vary depending upon the scanner used, the object being scanned and other factors. The occluded surface will be tagged in the solid model as "occluded", all other surfaces are tagged "imaged." The surface tags ("imaged" or "occluded") are retained in the solid model for later processing.

Figure 3:
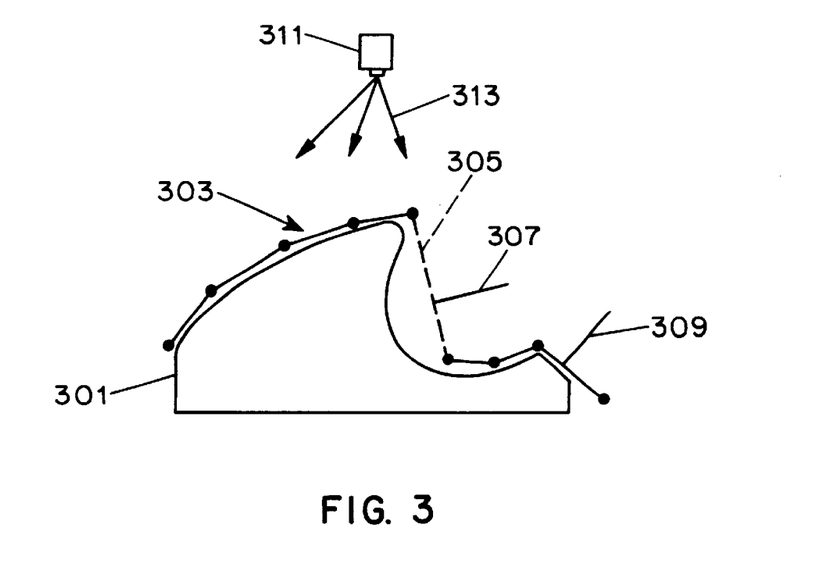
FIG. 3 shows a graphic example regarding the step of determining an occluded edge on a scanned object.

FIG. 3 shows a graphic example of the step of determining occluded surfaces on a scanned object. Object 301 is the object being scanned. Vertices 303 are the vertices which are scanned and generated by a raster type scanner 311 from one particular viewpoint. Edge 305 as defined between two adjacent vertices has a longer length, relative to the other edges scanned during the iteration, and thus is identified as an occluded edge. Any surfaces of which that edge is part are therefore occluded and require further scanning in order to properly represent the three-dimensional object. As an example, an occluded edge may be over three times as long as an average "imaged" (or scanned) edge. The surface normal 307 (orthogonal line relative to the surface) forms an approximate 80-degree angle with the line of sight to the sensor 313 (as shown) which exceeds the threshold of 75 degrees and therefore identifies the surface as "occluded." If this angle is under the predetermined threshold the surface is labeled "imaged" which means that portion of the surface is already scanned. Both determining techniques are used to label surfaces. A conventional mesh surface based model would not store edges or surfaces that are here represented as "occluded" and would not necessarily later rescan the space behind an occluded surface in order to provide a more correct image of the object.

Using the tagging process of the present invention, all surface elements, "imaged" and "occluded", in the model are present in the mesh before sweeping the mesh into a solid. The surfaces which are bounded by edges identified as "imaged" using the above described method are tagged as "imaged" surfaces in the model. These imaged tagged elements describe surfaces of the object that have been properly imaged and do not need to be imaged again. All the remaining surfaces which are identified as "occluded" surfaces are tagged as such and are targeted in the planning process for subsequent scans. The tagging process occurs for each model generated by a single range image. The images and occlusion tags are then combined in the next step using a merge operation.

Figure 4:
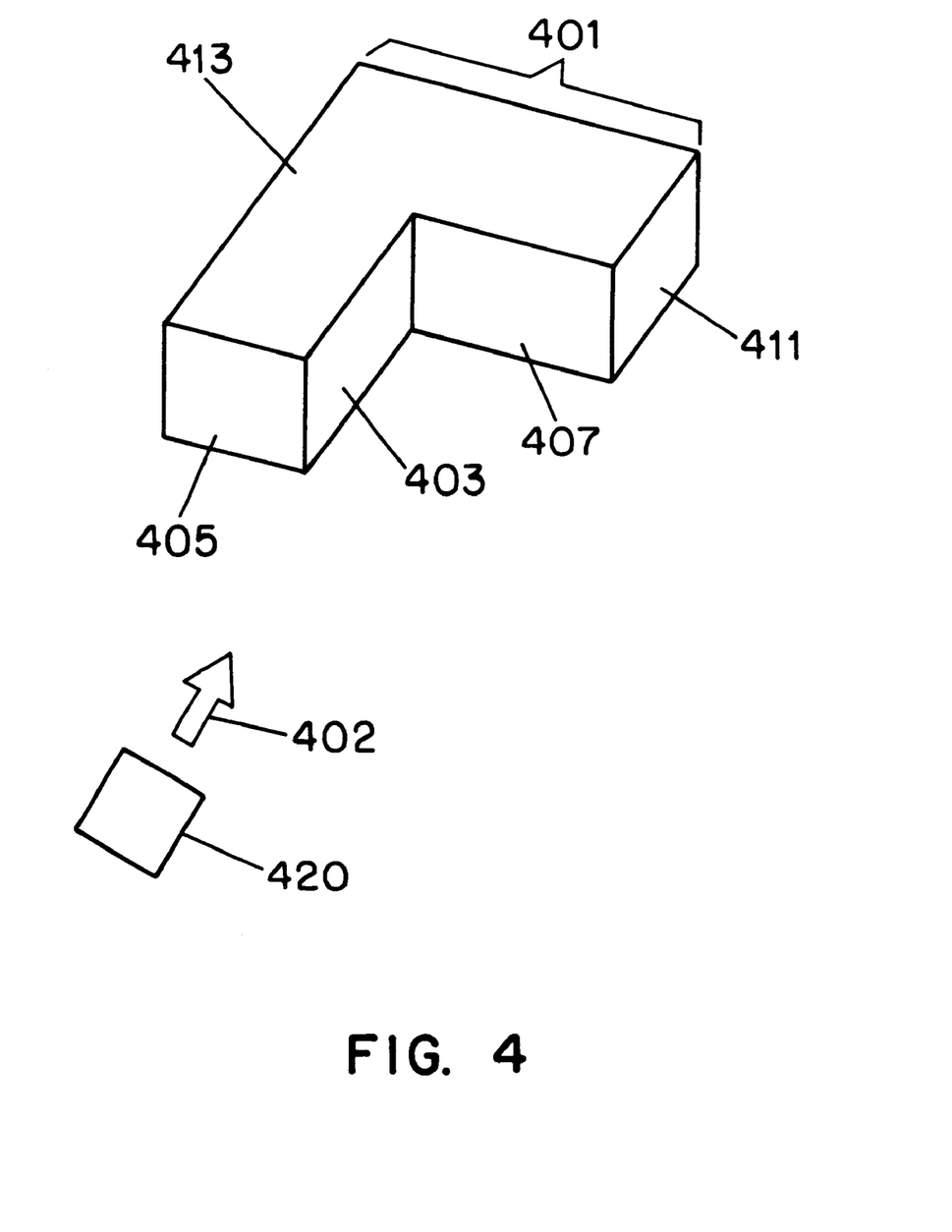
FIG. 4 shows an example of an object being scanned from a particular perspective.

FIG. 4 shows an example of an object being scanned from a particular position and modeling surfaces which are tagged as either "occluded" (not viewed) or "imaged" (scanned). Object 401 is a three-dimensional "L" shaped object with a number of different surfaces. The direction of the range finder's sensing axis for the scanner 420 is shown by arrow 402. Sides 405 and 407 are in a direct line of sight of the scanner and are fully scanned when the scanner is in the shown position and will be tagged "imaged". However surfaces 403 and 411 have surface normals whose angle with respect to the line of sight of the sensor are close to 90 degrees and thus are not fully imaged by the scanner for the scanner location shown in the figure. Also, if a cavity was present in side 403 or 411, the model would not register its existence from the current location of the scanner. Additionally, the shown top side 413 of object 401 is not viewed by the scanner in its current position. The sides not shown (two back sides and bottom) are also not imaged by the scanner. The mesh representation generated from the scanner will tag the region that corresponds to these surfaces as "occluded", and further scanning of the areas would be necessary to adequately model the entire object.

Referring back to FIG. 1, step 109 updates the composite model by merging the existing solid model created from previous scanner perspectives with the new range data acquired from the new scanner position. The first scan of the object in the beginning of the process will simply become the initial solid model which will later be combined with the models from other perspectives. Each successive sensing operation will result in obtaining new information that will be merged with the existing composite model and will form the new composite model. Each subsequent scan will allow the composite model to better reflect a greater number of scanned surfaces. In conventional mesh surface modeling, specialized techniques are necessary in order to merge information from scans from different perspectives. These specialized techniques have limitations both in accuracy and robustness and will only result in a closed model when all the objects's surfaces have been imaged, which is not practical for many objects which have occluded surfaces. In the present method, a closed solid model is generated from each viewpoint for each iteration which then allows the use of a merging method of solid models based on set intersection rather than on surface modeling techniques. CAD systems which can process the range data as solid models in the present invention have very robust techniques for set operations of solids which can then be used to accomplish the merging of each perspective model. The utilization of these solid based robust techniques are important because of the high density of the range elements, the many possible long and thin lateral surfaces and because the solid models from each viewpoint will have overlapping surfaces which are extremely close to each other.

The merging process is accomplished by performing a set intersection operation between the existing composite model and the model formed from the new range data. When the first iteration is performed, the first generated model is the composite model. The intersection operation must be able to correctly incorporate the occlusion tags from surfaces in the single perspective models into the overall composite model. A surface on the composite model will be a result of a volumetric intersection and will be related to either one or both of the intersected volumes in the overlap areas. There are two cases of occlusion tag overlap which must be addressed. In the first case where the surface on the composite model result is found on only one of the two intersected volumes, the surface occlusion tag may be directly copied from the original volume to which the surface belonged. In the second case where the two volumes have overlapping surfaces, the resultant tag is set to "imaged" if at least one of the tags from the surfaces being intersected is designated as imaged. Thus if a surface is imaged in one of the solid models, those imaged attributes will be incorporated into the composite model. The remaining surfaces which have not been imaged are still tagged as "occluded."

Step 111 checks if the number of initial scans prior to the planning stage have been completed. The number of initial scans before planning is predetermined and can be set based on the desired resolution and complexity of the object being scanned. The type of scanner can also impact the necessary number of initial scans. An example of a typical number of initial scans performed is four, although the number could be as small as one or could be greater than four.

If the technique has not completed the required number of initial scans, the view of the object is changed so that different range data will be generated for a different perspective and then merged with the existing solid model. The view can be changed by either changing the location of the scanner with respect to the object or change the orientation of the object relative to a fixed scanner. As long as the spatial relationship between the scanner and the object is known, it does not matter which piece is moved. The object can be initially viewed from a number of locations which will enable a majority of the surfaces of the object to be scanned. For example, if four scans are used each side of a rectangular object can be scanned. Alternatively, the top of the object can be scanned and the object can be viewed from three side positions (e.g., the corner points of a equilateral triangle with the object in the center). The predetermined positions in the initial scanning portion of the technique also depend upon the complexity of the object being viewed. If numerous surfaces appear on one side of the piece, the scanner operator may want to initially focus on that more complex area. After the view is changed, the technique continues with step 101 which then scans the object from the new view, builds the solid model for that view and merges it with the existing composite model.

If in step 113, the number of predetermined initial scans are completed, then the technique continues with step 115. Step 115 determines if the three-dimensional model has been modeled to an acceptable resolution and if a sufficient portion of the object has been scanned and modeled. This can be determined based on a visual examination of the model on a computer screen or print out by the user of the system or can be automatically determined by the occlusion tag data present in the model (e.g., 90% of all tags are designated as "imaged"). Other criteria for determining if the technique is complete can be responsive to the number of scanning iterations performed or can be based on the processing time if the imaging needs to be completed quickly for a particular application. If the composite image in step 115 is at an acceptable resolution and completeness, the technique is finished. If the composite model has not yet sufficiently modeled the object to the desired resolution or completeness, then the technique continues with step 117.

Step 117 plans the next viewing orientation so that the maximum amount of occlusion tagged surfaces are imaged in the next scan iteration. The planning technique is explained in more detail in conjunction with FIG. 8. The step determines the position for which the largest amount of surface areas which have not yet been imaged (i.e., the surface is tagged "occluded") and can be viewed in one scan operation. After the next view is planned, the technique continues with step 119.

Step 119 changes the view of the scanner in a similar manner as described in step 113. The scanner itself is moved to that position or the turntable upon which the object rests may be rotated to have the scanner in the correct relative position. The process then continues with step 101 which performs the next scan iteration. The technique will continue to plan the next best view position which captures the most remaining occluded areas of the object in the scan until the composite model image is sufficiently modeled for the operator's personal standards or programmed standards.

A recurring problem exists with most range scanners which view a space that is defined by a bounding area or volume. The scanning area can be defined by a near plane and a far plane such that in between the two planes any properly oriented surface will be imaged well enough to construct a useful model of those properly oriented surfaces. An object surface is properly oriented if it is within the angle of inclination of the range finder (scanner). The resolution of range finders are complicated by the changing distance from the sensor to the surface of the three-dimensional object being scanned. For example, a sensor may use a rotating mirror to project a laser in a series of angles in the imaging plane in order to scan the object, and so the resolution varies with both the depth from and distance along the sensor's baseline during the scan process.

Figure 5A:
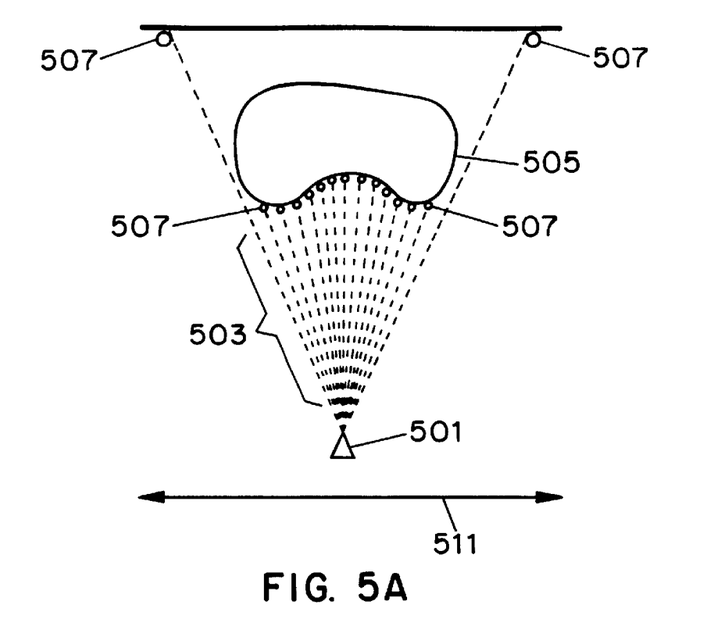
FIGS. 5A and 5B show an example of a scanner scanning an object.
Figure 5B:
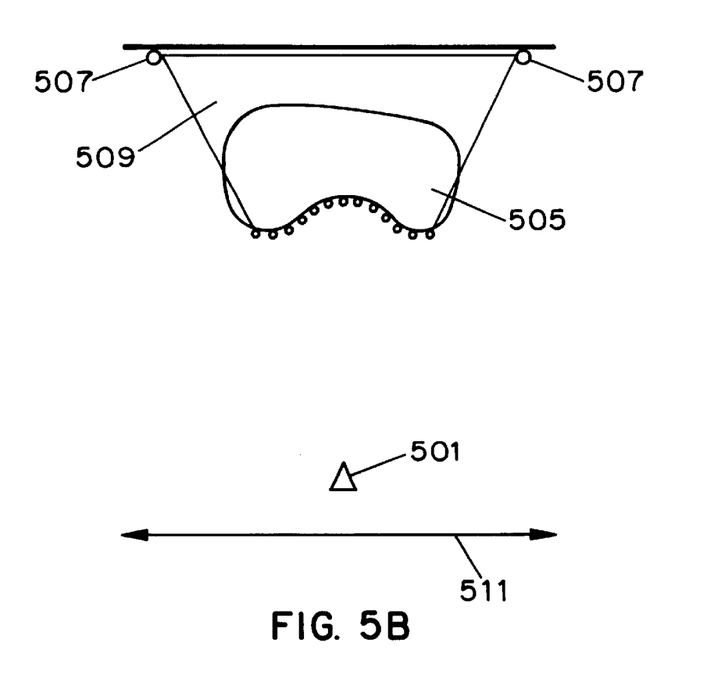

The acceptable modeled surface error, i.e., the distance by which the mesh surface may deviate from the true surface, is related to the actual distance between two adjacent vertices in the mesh. Thus the sampling interval, angle and distance of the surface with respect to the sensor are all related together because these factors affect the distance between two vertices. FIG. 5 shows an example of a surface which is scanned and modeled and which underestimates the actual surface of the object due to undersampling of the surface resulting in a large distance between vertices located in the mesh. FIG. 5A shows a scanner with its energy emission 503 imaging an object 505. The sensor baseline is shown as line 511 . FIG. 5A shows in two dimensions the points (vertices) 507 scanned during a typical range scan. FIG. 5B shows the solid formed by sweeping a mesh which is directly related to the scanned points. The solid 509 formed by the swept sensed points (vertices) 507 does not encompass the entire object as shown. The present technique performs a nonuniform dilation operation which prevents the imaged object from being underestimated and always ensure that all portions of the object are included in the solid model for a particular perspective. The dilation operation preferably occurs during the formation of the mesh in step 103 of FIG. 1. However, the dilation could also occur after the solid model is created and the occlusion tags are being generated. In the second case, the solid model would be expanded. Making sure that all points in the viewing direction of the object being scanned are included in the model from that perspective is very important because once a portion of an object is removed during a conventional intersection process, it may never be recovered.

In order to solve the problem of undersampled portions of the object not being included during a particular iteration, the model from for each scan iteration is nonuniformly dilated so that the model correctly represents the largest object that could have produced the point sampling given by the range image. The model surfaces at the boundary between the imaged and unimaged surfaces are the surfaces which need to be captured in the range view data of subsequent scan iterations. It is those surfaces tagged "occluded" in the model that require this dilation in order to guarantee that the entire object is captured in the current view. One or more of the surface's vertices in the unimaged area are moved in a direction of the sensor's baseline to expand the generated mesh of the object. Each vertex of the surface tagged "occluded" is preferably moved a distance equal to the sampling distance.

Figure 6:
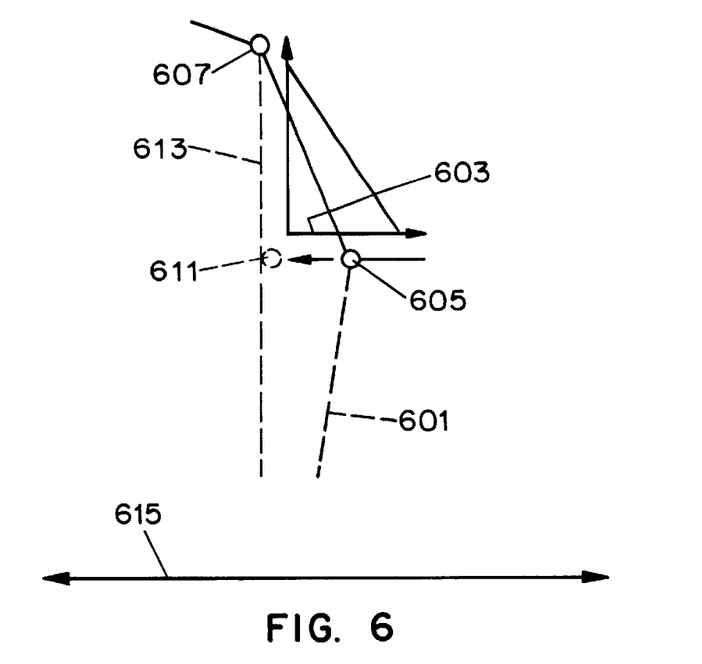
FIG. 6 shows an example of a mesh vertex being moved in order to properly image the entire object.

FIG. 6 shows an example of a vertex being moved in order to properly image the entire object from the scanning view. Ray 601 shows the direction of the senor's ray of emission (e.g., a laser beam). The sensor baseline is shown as line 615. The mesh created from the scan of object 603 (of which a portion is shown) has a mesh vertex 605 and a mesh vertex 607 on the surface mesh. Edge 609 which is defined between the two vertices shows that the corner of object 603 would not be included in the surface mesh before dilation and therefore would not be included in the composite solid model. In the dilation technique, the vertex is moved along the baseline for one sampling distance (horizontal distance between two vertices) so that the surface mesh will now cover all of object 603. The extra portion of the mesh which does not correspond to the actual object will be eliminated when it is intersected with another planned view which is executed due to presence of the occluded edge 613. Any surface of which this edge is part is tagged "occluded" both because of the relatively long length of the edge and because the angle between the normal to the edge direction and the line of sight to the sensor is relatively close to 90 degrees as described above.

Figure 7:
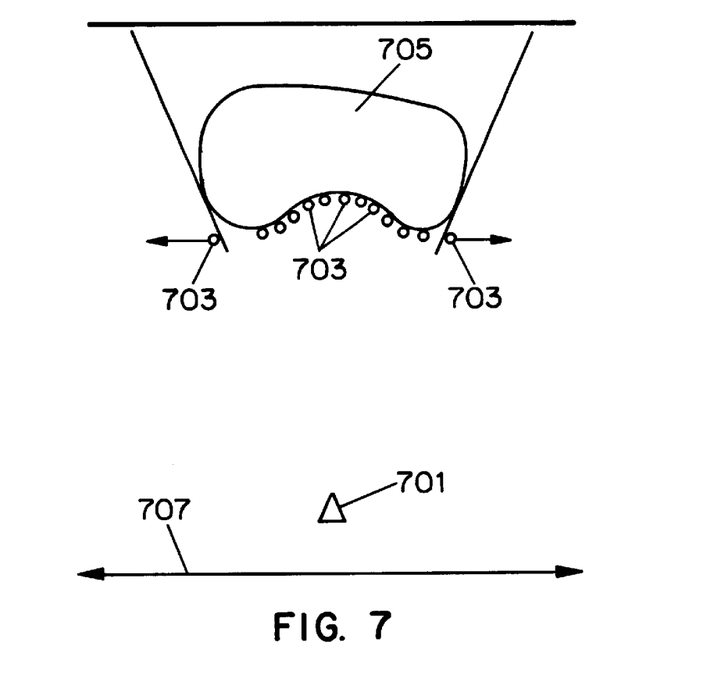
FIG. 7 shows the effect of the movement of the mesh vertex.

The overall effect of the dilation of the vertices is shown in the example of FIG. 7. Sensor 701 now generates a surface mesh including all of the vertices 703 and all of the object 705 is included under the surface mesh. The sensor baseline is shown as line 707. Subsequent merging of range data from other views will eliminate any unwanted portion of the composite solid model.

The planning process of step 115 is implemented by the construction of a visibility volume $V_{target}$ for a target surface that specifies the set of all sensor positions that have an unobstructed view of the specified target surface. The target surface is selected from the model surfaces tagged "occluded." This target volume can be computed by first determining $V_{unoccluded}$, which is the visibility volume for the case where there are no occlusions, and subtracting $O_i$, the volume containing the set of sensor positions occluded from the target by model surface i, for each surface of the model. The equation is expressed as:

$$V_{target} = V_{unoccluded} - \cup O_i \qquad (2)$$

The volume described by $V_{unoccluded}$ is a half space whose defining plane is coincident with the target's face, with the half-space's interior being in the direction of the target's surface normal. $O_i$, the volume of the set of sensor positions that model surface i occludes from the target, is similar in construction to the occlusion volume discussed above, and is generated via a conventional geometric algorithm based on space decomposition that determines the space that the element blocks for viewing the entire target.

Figure 8:
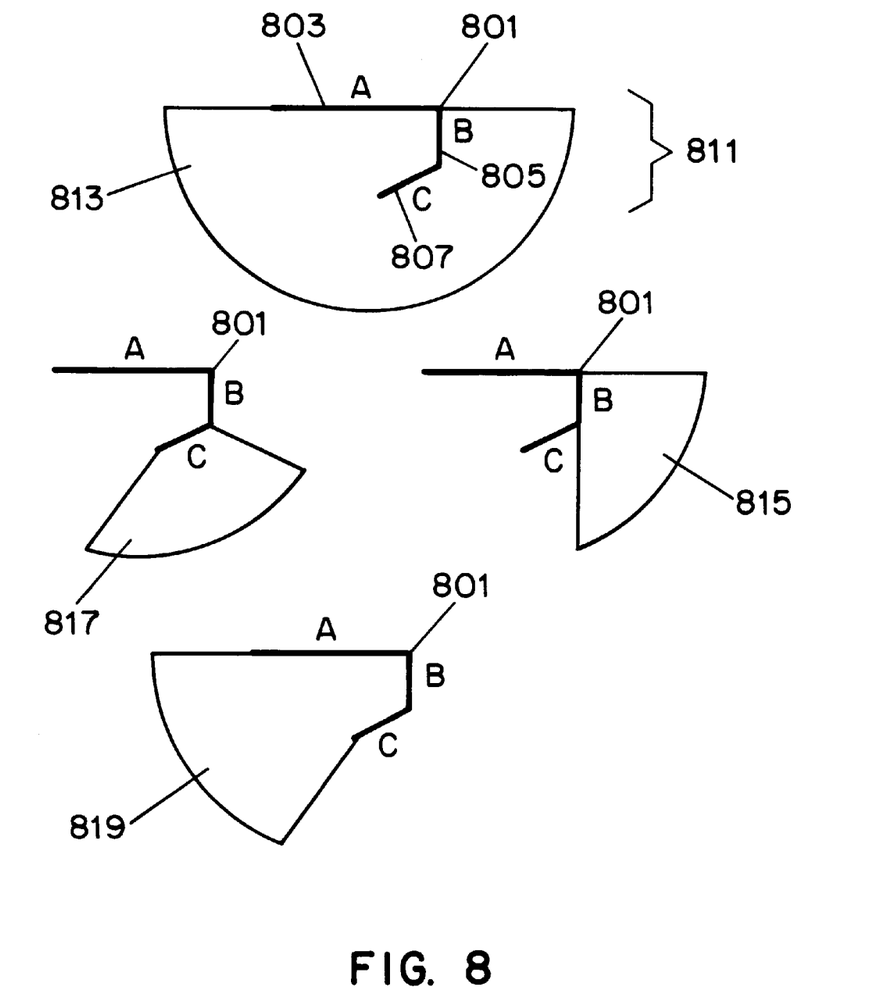
FIG. 8 illustrates how visibility targets are selected using a two dimensional object.

FIG. 8 illustrates computing the visibility region for a two dimensional target with three surfaces to be imaged; in three dimensions, these regions correspond to volumes. Object 801 is shown in two dimensions which has three different surfaces: surface A 803, surface B 805 and surface C 807. In the example, a resolution constraint is imposed so that the sensor must be within a fixed distance from the target's center. This constraint causes $V_{unoccluded}$ to be a half-circle in two dimensional space. Model 811 shows $V_{unoccluded}$ for surface A as half-circle 813. Once the visibility region is computed, viewing parameters that are specific to the real sensor are included to further constrain the visibility region. In this case, a scanner would be blocked from viewing all of surface A 803 by the other surfaces B 805 and C 807 depending upon its position. The occluded sensor region for viewing surface A 803 due to surface B's occlusion is shown as region 815, and the occlusion due to surface C is region 817. The visibility region is then calculated by subtracting the occluded regions 815, 817 from the unoccluded region 813. The result yields visibility region V 819. The next scanning operation will be positioned near the center of visibility region V in order to best view surface A 803. In this two dimensional example, the regions are areas, however, in the invention these three dimensional regions are volumes. Once the scanner position is established, a physical transform is applied to bring the sensor into the visibility volume for the target, and the model acquisition process repeats for future targets.

Multiple targets can be used in the planning process. Thirty, or another selected number depending upon the level of optimization required, occluded surfaces with the largest area are selected as targets and visibility volume plans are generated for each of them. These visibility volume plans for each target are then intersected with the sensor's reachable space. The overlapping visibility volume plans which are in the sensor's reachable space are identified as sensor positions which will scan more than one target. These overlapping regions are then searched for a position of the sensor which targets the most overlapped area. An example of sensor placement is in the center of the overlapped area.

Figure 9:
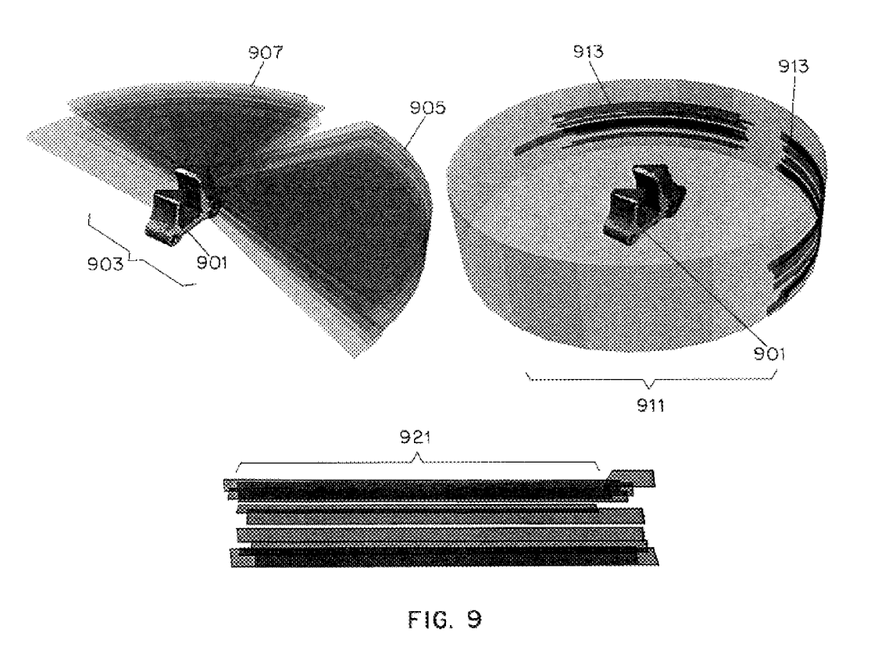
FIG. 9 is a graphic example of the selection of the visibility targets.

FIG. 9 shows a graphic example of the multiple target planning process described above. Object 901 is shown at a point in the process in which some of its surfaces have been tagged "occluded" and the next planning phase has been initiated. The areas containing the most contiguous surfaces tagged "occluded" then have visibility volumes (e.g., volume 905, 907) calculated for each of them as shown in the graphic representation 903. The visibility volumes are then intersected with a cylindrical sensor radius which is a constraint that occurs when the object is placed on a turnable table and the sensor is fixed. The intersections of the overlapping visibility volumes and the sensor reachable space is shown at a point in graphic representation 911 by regions 913. The regions can then be "unwrapped" into a plane as shown in representation 921 and the region with the most overlapping visibility volumes will be the next target. Depending upon the mobility of the object and sensor, the sensor reachable space can be also a sphere around the object.

Figure 10:
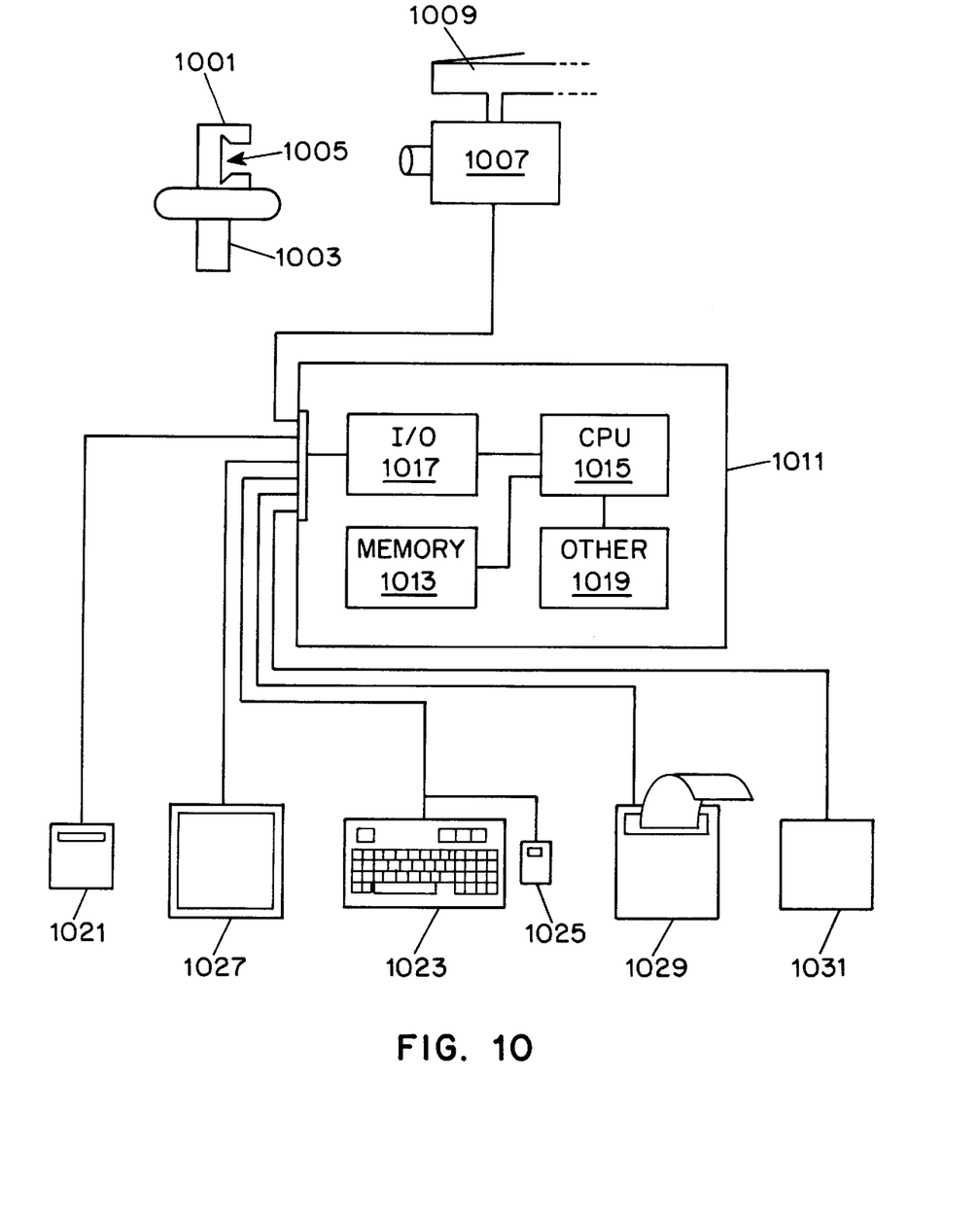
FIG. 10 shows a schematic diagram of system which creates a three-dimensional representation.

FIG. 10 is a diagram of a system which can create a three-dimensional representation in accordance with the invention. An object 1001 to be scanned is placed upon a turning pedestal 1003. The object 1001 in this example includes an occluded area 1005 which will require further planned scanning. A scanner 1007 is attached to a holder 1009 so that the scanner is properly positioned to scan the object from a particular perspective. In this example, the scanner uses a raster type movement to scan the image in its field of view. The object can then be turned to present different sides to the scanner. The scanner 1007 can also be moved in order to place it in the proper relative position. Either the object or the scanner can be moved separately or in combination as long as the relative positions are known so that the technique can properly account for the different scanning positions.

The scanner 1007 is connected to a computer 1011 which stores a software program in memory which provides instructions to perform the technique as described above. CPU 1015 executes the program stored in memory 1013. Input/Output circuitry 1017 allows the computer to communicate with the scanner, display, keyboard and mouse, printer, fax machine and other communication devices. Box 1019 contains other circuitry necessary for the operation of the computer. The components are connected by conventional data buses and connectors. The three-dimensional representation can be stored in a portion of memory 1013 or on a disk through drive 1021. A keypad 1023 and mouse 1025 are used by an operator to initialize the scanning operation, further analyze and transmit the three-dimensional representation once formed and terminate the scanning operation. Display 1027 is connected to computer 1011 and allows a user to view the three-dimensional representation from all available angles and different frames of reference. The model can also be subsequently altered if necessary as in the case of the manufacturing design of an object. A printer 1029 can also be connected to computer 1011 from printing out the three-dimensional representation from a particular perspective for additional analysis. Communication device 1031 can be a transmittal device or can be a connection to a network or the world wide web.

The system shown is the preferred system to implement the technique, however, other system configuration can also be used such as a scanner which can be moved in multiple directions while keeping the object in fixed position or an object holder which can move the object in the x, y and z directions.

Figure 11:
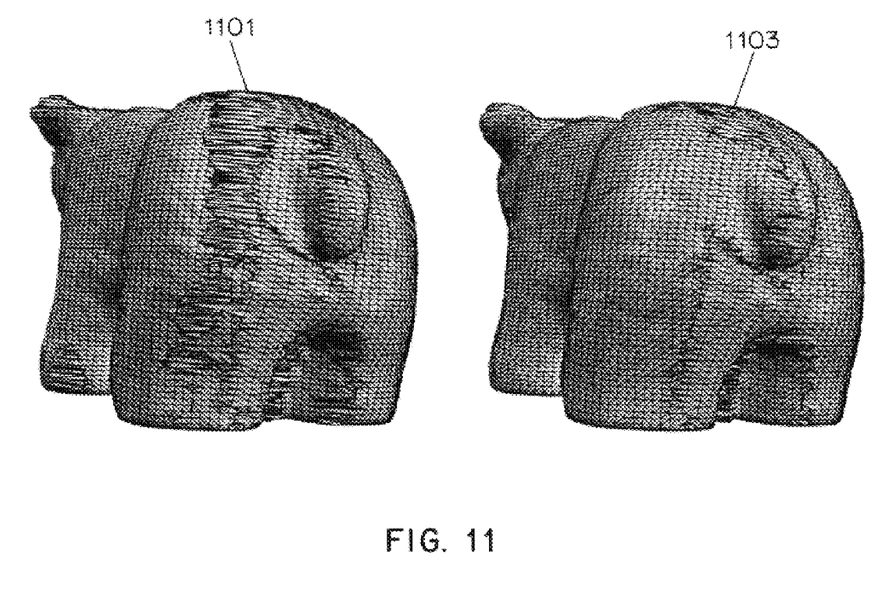
FIG. 11 shows a solid mesh model of a toy bear created without and with dilation of the mesh vertices.

FIG. 11 shows a graphic example of a three dimensional solid mesh model representation produced in accordance with the invention. The objects 1101 and object 1103 show a toy bear which has been scanned from a number of different range images and formed into the solid model. The two figures show a model which has been subjected to dilation and which has not been subject to dilation. Object 1101 shows a bear model using sensed points directly as vertices for each range view. Object 1103 shows a bear model using the dilation process on the mesh of each range image before the sweeping of the mesh is performed. Object 1103 can be seen as having a better representation of the bear by better defining outside edges which were not captured in the bear image 1101.

Figure 12:
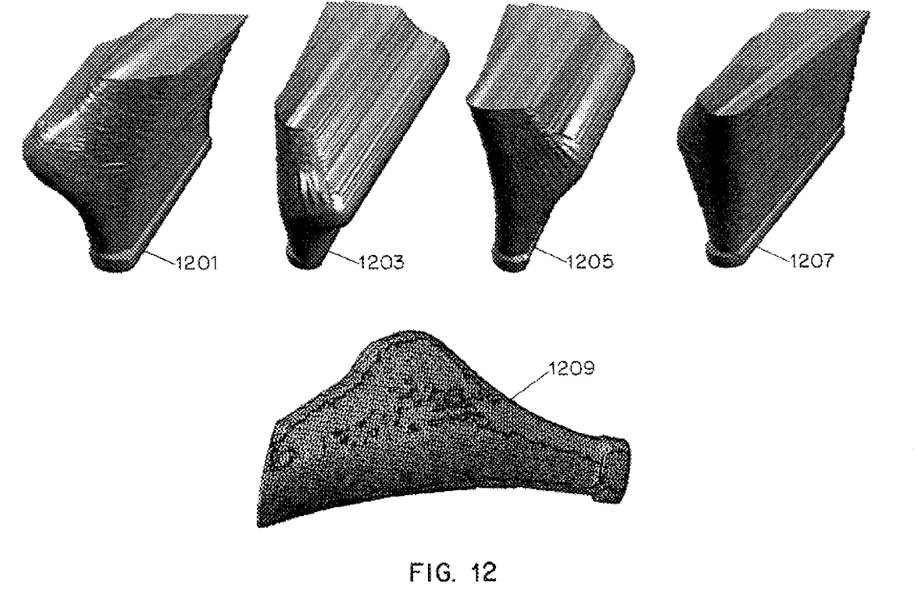
FIG. 12 shows a graphic example of the construction of a solid model of a hip joint prosthesis.

FIG. 12 is a graphic example of a hip joint prosthesis for which a representation has been generated according to the invention. In this example, four range images where generated: range images 1201, 1203, 1205 and 1207. The four range images when combined in succession into a composite model to create composite model 1209 as shown in FIG. 12. Four different perspectives of the prosthesis were used to create the composite model. Additional range images could be planned and used to integrate and improve the detail the composite image and its representation of the object being imaged.

Figure 13:
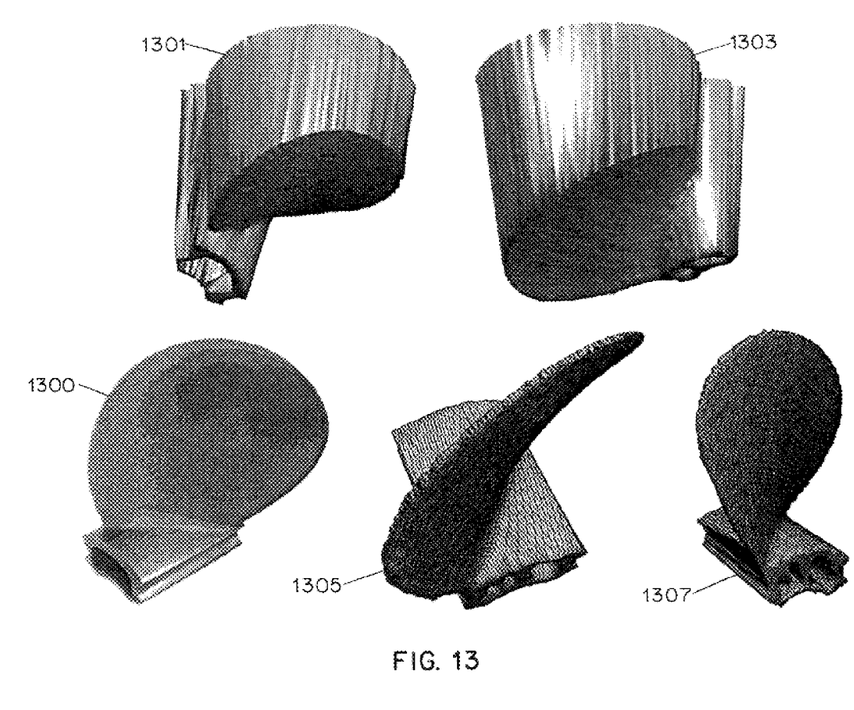
FIG. 13 shows a graphic example of the construction of a solid model of a propeller.

FIG. 13 shows a graphic example of a propeller blade which has been represented according to the invention. Propeller 1300 is an object which is automatically imaged according to the invention. Range images 1301 and 1303 show the solid models constructed from two different perspectives. When the two perspectives are integrated into a composite model, the wire frame of that composite model appears as view 1305 from one direction and view 1307 from a different direction. Additional range images could be planned and used to integrate and improve the detail the composite image and its representation of the object being imaged.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A method for generating a three-dimensional representation of at least one object comprising:
   a. scanning said at least one object from at least one view and initially generating said representation including data elements responsive to the presence of said object in said at least one view;
   b. storing visibility attributes associated with said data elements;
   c. selecting a targeted area on said at least one object responsive to said visibility attributes;
   d. further scanning said targeted area and generating additional data elements and additional corresponding visibility attributes for said further scan;
   e. modifying said representation and said stored visibility attributes responsive to said new data elements and said new visibility attributes; and
   f. repeating steps c through e until a termination condition occurs.

2. The method of claim 1, wherein said data elements are organized as a mesh representation.

3. The method of claim 2, further including the step of extruding said mesh representation into a solid model.

4. The method of claim 3, further including the step of joining said extruded representations into one representation.

5. The method of claim 1, wherein said storing step includes determining if an edge between two of said data elements is occluded.

6. The method of claim 5, wherein said storing step includes determining if a surface defined by at least said edge is occluded.

7. The method of claim 5, wherein said determination is responsive to said edge's length.

8. The method of claim 6, wherein said determination is responsive to said surface's normal relative to sensing direction of said object being scanned.

9. The method of claim 1, wherein said scanning step a is performed for a predetermined number of times to produce said representation.

10. The method of claim 9, wherein said predetermined number is four.

11. The method of claim 1, wherein said target area selected encompasses the greatest surface area of remaining data elements with an associated visibility attribute which indicates an occlusion.

12. The method of claim 11, wherein said greatest surface area of remaining data elements is determined by a construction of a visibility volume for said occluded attributes associated with said at least one object.

13. The method of claim 1, wherein said visibility attributes which indicate that said data elements are occluded are changed to indicate said data elements are unoccluded when said further scanning operation scans said occluded data elements if said data elements are positioned within a scanning field of said further scan operation.

14. The method of claim 1, wherein said visibility attributes which indicate that a surface defined by said data elements is occluded is changed to indicate said surface is unoccluded when said further scanning operation scans said occluded surface if said surface is positioned within a scanning field of said further scan operation.

15. The method of claim 2, wherein said data elements in said mesh which are near said at least one object's outside edges are moved in a direction which increases said mesh's size.

16. The method of claim 15, wherein said moved data elements are moved one sampling distance.

17. The method of claim 1, wherein said termination condition is predetermined prior to said scanning operation.

18. The method of claim 17, wherein said termination condition is responsive to said representation's resolution.

19. The method of claim 1, wherein said termination condition is selected by a user during said generation method.

20. A method for generating a three-dimensional representation of at least one object comprising the steps of:
   a. generating a composite solid representation of said at least one object being scanned, wherein said solid representation includes occlusion tags corresponding to a plurality of surfaces in said solid representation;
   b. selecting the next best view of said at least one object which encompasses the greatest surface area of said occlusion tags indicating an occluded state;
   c. scanning said selected next view and generating a new solid representation with a plurality of occlusion tags responsive to said next view;
   d. merging said composite representation with said new representation generated in step c to generate an updated said composite representation;
   e. repeating steps b through d until a termination condition occurs.

21. The method of claim 20, wherein said merging step includes comparing corresponding occlusion tags from said composite model with said new representation.

22. The method of claim 21, wherein each said occlusion tags of said updated composite model indicate a scanned condition if at least one of said corresponding tags indicates a scanned condition.

23. The method of claim 20, wherein said solid is generated from a mesh, and said occlusion tags' indication is responsive to an edge in said mesh.

24. The method of claim 23, wherein said occlusion tag's indication is responsive to said edge's length.

25. The method of claim 23, wherein said occlusion tags are responsive to a surface determined by at least one said edge.

26. The method of claim 25, wherein said occlusion tag's indication is responsive to said surface's normal relative to an axis scanning direction of a scanner.

27. The method of claim 20, wherein said generating step a is performed for a predetermined number of scans to produce said composite representation.

28. The method of claim 20, wherein determining said greatest surface area in said selecting step is performed by constructing a visibility volume.

29. The method of claim 20, wherein said mesh comprises data elements, and said data elements near said at least one object's outside edges are moved in a direction which increases said mesh's size.

30. The method of claim 29, wherein said moved data elements are moved one sampling distance.

31. The method of claim 20, wherein said termination condition is predetermined prior to said scanning operation.

32. The method of claim 31, wherein said termination condition is responsive to said resolution of said at least one object.

33. A system for generating a three-dimensional representation of at least one object comprising:
   a. means for scanning said at least one object from at least one view and generating scan data responsive to the presence of said object in said view;
   b. means for initially generating a representation comprising data elements responsive to said scan data;
   c. means for storing visibility attributes associated with said data elements;
   d. means for selecting a targeted area on said at least one object responsive to said stored visibility attributes;
   e. means for further scanning said targeted area and generating additional data elements and additional corresponding visibility attributes for said further scan; and
   f. means for modifying said representation and said stored attributes responsive to said new data elements and said new visibility elements.

34. The system of claim 33, further including a monitor to display said representation.

35. The system of claim 33, further including an input means wherein said scanning means' use is responsive to said input means.

36. The system of claim 33, further including a means for communicating said representation to an external terminal.

37. The system of claim 33, wherein said representation is generated from a mesh.

38. The system of claim 37, further including a means for moving at least one data element in said mesh to expand said mesh.

* * * * *